US006506502B2

(12) United States Patent
Lo et al.

(10) Patent No.: US 6,506,502 B2
(45) Date of Patent: Jan. 14, 2003

(54) REINFORCEMENT PREFORM AND METAL MATRIX COMPOSITES INCLUDING THE REINFORCEMENT PREFORM

(75) Inventors: Jason S. H. Lo, Nepean (CA); Areekattuthazhayil K. Kuriakose, Nepean (CA); Raul Santos, Ottawa (CA)

(73) Assignee: Her Majesty the Queen in right of Canada, as represented by the Minister of Natural Resources, Ottawa (CA)

( * ) Notice: Subject to any disclaimer, the term of this patent is extended or adjusted under 35 U.S.C. 154(b) by 8 days.

(21) Appl. No.: 09/809,161

(22) Filed: Mar. 16, 2001

(65) Prior Publication Data

US 2001/0015271 A1 Aug. 23, 2001

Related U.S. Application Data

(63) Continuation-in-part of application No. 09/357,161, filed on Jul. 19, 1999, now Pat. No. 6,247,519.

(51) Int. Cl.$^7$ .............................. B32B 5/16; C22C 1/10; C22C 49/14; C22C 47/04; C22C 47/06
(52) U.S. Cl. ..................................... 428/614; 428/293.1
(58) Field of Search ..................... 164/98, 97; 264/603, 264/333; 428/614, 608, 611, 627, 632, 633, 293.1, 469

(56) References Cited

U.S. PATENT DOCUMENTS

| | | | | |
|---|---|---|---|---|
| 2,755,164 A | * | 7/1956 | Van Der Willigen | 148/23 |
| 2,910,371 A | * | 10/1959 | Ryschkewitsch | 106/57 |
| 3,285,019 A | * | 11/1966 | Henderson et al. | 62/3 |
| 3,529,655 A | | 9/1970 | Lawrence | 164/97 |
| 3,701,379 A | * | 10/1972 | Fassler et al. | 164/132 |
| 4,279,289 A | | 7/1981 | Ban et al. | 164/97 |
| 4,548,774 A | | 10/1985 | Akiyama et al. | 264/44 |
| 4,576,919 A | * | 3/1986 | Hodge | 501/9 |
| 4,657,876 A | | 4/1987 | Hillig | 501/87 |
| 4,702,304 A | * | 10/1987 | Rice | 164/529 |
| 4,715,422 A | | 12/1987 | Tommis et al. | 164/97 |
| 4,762,305 A | * | 8/1988 | Rice | 266/281 |
| 4,800,065 A | | 1/1989 | Christodoulou et al. | 420/129 |
| 4,885,265 A | * | 12/1989 | Hillig et al. | 501/95 |
| 4,932,099 A | | 6/1990 | Corwin | 164/97 |
| 4,995,444 A | | 2/1991 | Jolly et al. | 164/97 |
| 5,141,683 A | | 8/1992 | Hyndman et al. | 264/44 |
| 5,322,109 A | | 6/1994 | Cornie | 164/97 |
| 5,347,426 A | | 9/1994 | Dermarkar et al. | 361/708 |
| 5,360,662 A | | 11/1994 | Wong | 428/288 |
| 5,409,580 A | | 4/1995 | Gesing et al. | 204/67 |
| 5,458,181 A | | 10/1995 | Corbett et al. | 164/97 |
| 5,464,583 A | | 11/1995 | Lessing | 264/60 |
| 5,571,758 A | | 11/1996 | Grossman | 501/92 |
| 5,635,432 A | * | 6/1997 | Honda et al. | 501/97.1 |
| 5,711,362 A | | 1/1998 | Rohatgi | 164/97 |
| 5,765,624 A | | 6/1998 | Hathaway et al. | 164/97 |
| 5,791,397 A | | 8/1998 | Suzuoki et al. | 164/97 |
| 5,817,432 A | | 10/1998 | Chwastiak et al. | 428/698 |
| 5,839,329 A | | 11/1998 | Smith et al. | 76/108.2 |

FOREIGN PATENT DOCUMENTS

| | | | | |
|---|---|---|---|---|
| CA | | 852134 | | 9/1970 |
| CA | | 890809 | | 1/1972 |
| CA | | 1200674 | | 2/1986 |
| CA | | 2000770 | | 4/1990 |
| CA | | 2040499 | | 10/1992 |
| CA | | 2145161 | | 3/1994 |
| CA | | 2238520 | | 6/1997 |
| CA | | 2257081 | | 3/1998 |
| GB | | 2209334 A | * | 5/1989 |
| JP | | 04-114958 | * | 4/1992 |

* cited by examiner

Primary Examiner—John J. Zimmerman
(74) Attorney, Agent, or Firm—Robert A. Wilkes

(57) ABSTRACT

A preform for use in a metal matrix composite, particularly for a magnesium metal composite, and a metal matrix composite, typically made by squeeze casting, using the preform. In the preform the reinforcing material typically is silicon carbide, boron nitride, carbon or graphite. The binder used in the preform is magnesium fluoride, which avoids the known problems which result from the high reactivity of magnesium metal with other binders, such as silica and alumina, which results in the formation of magnesium oxide in the reinforced composite. The presence of magnesium oxide crystals in the metal matrix adversely affects the properties of the composite.

6 Claims, No Drawings

REINFORCEMENT PREFORM AND METAL MATRIX COMPOSITES INCLUDING THE REINFORCEMENT PREFORM

RELATED APPLICATIONS

This application is a continuation-in-part of application Ser. No. 09/357,161, filed Jul. 19, 1999, and issued as U.S. Pat. No. 6,247,519.

FIELD OF THE INVENTION

This invention is concerned with reinforcing preforms used in the production of metal matrix composites, and with the resulting reinforced metal. More particularly, this invention is concerned with preforms for use in making magnesium metal matrix composites.

DESCRIPTION OF THE PRIOR ART

It is well known that many metals, especially the so-called light metals, which generally includes aluminum, magnesium, and alloys of each of these metals, whilst having many of the advantages of a metal, such as the ability to be welded, and the particular advantage of low weight, also have the disadvantage that their strength properties are relatively low. In the past, this has limited the usefulness of these metals. One method that has been proposed to overcome this difficulty is to use the metals in the form of a composite, so that the composite more than compensates for the lack of mechanical, physical and other properties. Typical materials used as the reinforcement in such a composite include carbon, graphite, silicon carbide, titanium diboride, boron carbide and boron nitride. Techniques for making metal matrix composites from both aluminum and magnesium are well known, and have been described for example in U.S. Pat. No. 4,279,289; U.S. Pat. No. 4,715,442; U.S. Pat. No. 4,995,444 and U.S. Pat. No. 5,791,397.

These methods broadly involve a two step technique. In the first step, a preform is made from the reinforcing material, which is held together with a binder material. The commonly used binders are ceramic materials, of which silica is perhaps the commonest. The reinforcing material is generally invested with the binder system, and then fired both to burn off organic materials used to aid investment with the binder, and to convert the binder into silica. In the second step, the preform is invested with the molten metal to provide a composite material, typically by using the so-called squeeze casting technique, in which the molten metal is forced under high pressure into the preform contained in a mould.

Although these methods are more or less successful with aluminum, and aluminum alloys, they are less successful when used to fabricate composites in which the metal is magnesium, or a magnesium containing alloy. The difficulties arise from the fact that molten magnesium is a very reactive material, which has two consequences.

The first is that the use of silica as the preform binder becomes questionable, because the following reaction occurs:

$$2Mg + SiO_2 \rightarrow Si + 2MgO.$$

The silicon that is formed will dissolve into the magnesium to form a silicon-magnesium phase which generally will not have a deleterious effect on the properties of the magnesium metal, and thus of the resulting composite. The magnesium oxide is formed as a more or less crystalline solid, which does not dissolve in the magnesium metal. The presence of these crystals of magnesium oxide has been shown to have a deleterious effect on the overall properties of the composite when a sufficient amount is present. It can therefore be seen that this reaction places significant restrictions on the preform binder that can be used if the creation of magnesium oxide is to be avoided.

The second is that similar reactions will also happen with several of the other materials commonly used as either binders or reinforcement; all of the following reactions are known to occur:

$$3Mg + Al_2O_3 \rightarrow 2Al + 3MgO$$

$$2Mg + TiO_2 \rightarrow Ti + 2MgO$$

$$Mg_3(PO_4)_2 + 5Mg \rightarrow 8MgO + 2P$$

The aluminum and titanium alloy with the magnesium, and the phosphorus vaporizes. In the first two cases, although the aluminum and titanium have minimal, if any, effect on the properties of the resulting composite, this cannot be said for the magnesium oxide crystals that are produced in all three cases. The presence of brittle and weak magnesium oxide crystals makes the composite prone to crack formation. It can also be seen that these reactions place significant limitations on the materials which can be used to reinforce magnesium if the creation of magnesium oxide is to be avoided.

SUMMARY OF THE INVENTION

There is therefore a need for a binder system that can be used to create preforms for use in the manufacture of composites, in which the metal used is magnesium, or a magnesium alloy. Further, such a binder system should desirably be equally useful with both particulate and fibrous reinforcing materials, and should be potentially useful with other, less reactive, metals.

This invention seeks to provide a reinforcement preform for a magnesium metal matrix composite which involves the use of a preform binder system which is unreactive with molten magnesium, does not cause the creation of undesirable solid materials in the magnesium composite, and which can be used with the reinforcing materials commonly used with magnesium which do not involve the formation of magnesium oxide during the casting process. In addition, this invention also seeks to provide a reinforcement preform useful in composites in which the metal is not magnesium, such as aluminum and alunimum alloy composites.

DETAILED DESCRIPTION OF THE INVENTION

Thus in a first embodiment this invention seeks to provide a reinforcement preform for a metal matrix composite, wherein the preform is bonded with sintered magnesium fluoride.

In a second broad embodiment, this invention seeks to provide a metal matrix composite, including a reinforcement preform bonded with sintered magnesium fluoride.

The sintered magnesium fluoride bonded preform is conveniently prepared by a process comprising:
(a) forming a slurry of the reinforcing material with magnesium fluoride in an aqueous solution of magnesium chloride;
(b) pouring the slurry into a mould;
(c) allowing the slurry in the mould to set, to provide a shaped green preform;

(d) drying the green preform to remove water; and (e) firing the green preform at a temperature of about 1,100° C. to provide a finished preform, in which the binder is sintered magnesium fluoride.

For infiltration with a metal, such as magnesium, the preform is placed in a second mould; and infiltrated in the second mould with molten metal to provide a metal composite, for example by the squeeze casting method.

Preferably, the metal in the reinforced composite is a light metal. More preferably, the metal in the reinforced composite is aluminum, magnesium, or an alloy thereof. Most preferably, the metal is magnesium, or an alloy thereof.

Preferably, the reinforcement used in the preform is chosen from at least one member of the group consisting of carbon, graphite, boron carbide, silicon carbide, titanium diboride, boron nitride, and mixtures thereof.

Preferably, the reinforcement comprises a particulate reinforcement. Alternatively, the reinforcement comprises a fiber, tow or whisker material. In a further alternative, the reinforcement comprises a mixture of particulate and/or fibre and/or tow and/or whisker reinforcement, so that a hybrid composite is obtained including more than one reinforcement in more than one physical form.

In the process to make the reinforcement perform a slurry is first prepared of the reinforcing material, for example of particulate silicon carbide, mixed with magnesium fluoride in a solution of magnesium chloride. The slurry is poured into a porous mould, for example to provide a disc shaped preform, and allowed to set. During the setting process, hydrated magnesium chloride, $MgCl_2.6H_2O$, is formed, which serves as a low temperature binder, to hold the green preform together. The cast disc is then air dried, typically by gentle heating in an oven at about 45° C. The use of a porous mould ensures that the preform dries evenly, and without cracking or other deformation, during the drying step. The hydrated magnesium chloride imparts sufficient green strength to the preform to enable it to be handled with reasonable care.

The dried green preform is then fired at about 1,100° C. In the firing step, the magnesium chloride decomposes, and is essentially driven off; at the same time the magnesium fluoride sinters, bonding the silicon carbide powder together to form a porous body. The resulting fired disc is also quite strong enough to be handled.

In order to make a metal composite, for example a magnesium or magnesium alloy composite, the shaped preform is placed in a second mould, and then infiltrated with molten magnesium, or a molten magnesium alloy. Typical alloying elements for magnesium include aluminum, beryllium, calcium, copper, lithium, manganese, metals from the rare earths group, silicon, silver, thorium, tin, zinc, zirconium, and yttrium, and combinations of metals. Similarly, aluminum or an aluminum alloy can be used as the infiltrated metal. Typical alloying elements for aluminum include magnesium, beryllium, calcium, copper, lithium, manganese, metals from the rare earths group, silicon, silver, thorium, tin, zinc, zirconium, and yttrium, and combinations of metals.

It is preferred that the infiltration of the preform to provide the desired metal composite is carried out by the squeeze casting method.

It can thus be seen that the binder of this invention avoids the difficulties attendant on the use of a binder with which molten magnesium, or a magnesium alloy, can react. Examination of magnesium composites made by this process, in which the reinforcement is silicon carbide, shows that the majority of the magnesium fluoride remains bonded to the silicon carbide. A proportion of it appears to crack away, and does not apparently have any deleterious effect on the properties of the composite.

Although the magnesium fluoride binder used in the process of this invention is uniquely suitable for use in preforms which are later infiltrated with molten magnesium or a molten magnesium alloy since it will not react with them, it is not so limited. It is suitable for use with other metals where the reaction problem does not arise, in particular aluminum and aluminum alloys.

What is claimed is:

1. A metal matrix composite including a reinforcement preform bonded with sintered magnesium fluoride, wherein the reinforcement material used in the preform is chosen from at east one member of the group consisting of carbon, graphite, silicon carbide, titanium diboride, boron carbide, boron nitride and mixtures thereof.

2. A metal matrix composite according to claim 1 wherein the reinforcement material is in a physical form chosen from at least one of the group consisting of particulate, fibre, tow, whisker and mixtures thereof.

3. A metal matrix composite according to claim 1 wherein the preform comprises a sintered magnesium fluoride bonded particulate reinforcement.

4. A metal matrix composite according to claim 1 wherein the metal matrix is chosen from the group consisting of magnesium, aluminium, magnesium alloys, and aluminium alloys.

5. A metal matrix composite according to claim 4 in which the metal matrix is a magnesium alloy including at least one element chosen from the group consisting of aluminum, beryllium, calcium, copper, lithium, manganese, metals from the rare earths group, silicon, silver, thorium, tin, zinc, zirconium, and yttrium.

6. A metal matrix composite according to claim 4 in which the metal matrix is an aluminium alloy including at least one element chosen from the group consisting of magnesium, beryllium, calcium, copper, lithium, manganese, metals from the rare earths group, silicon, silver, thorium, tin, zinc, zirconium, and yttrium.

* * * * *